(12) United States Patent
Lehman et al.

(10) Patent No.: US 6,237,712 B1
(45) Date of Patent: May 29, 2001

(54) CONTROLLED TWO-SPEED AXLE SHIFTING WITH AUTOMATIC TRANSMISSION

(75) Inventors: Michael J. Lehman, Fort Wayne; Burnell L. Bender, Woodburn, both of IN (US)

(73) Assignee: Navistar International Transportation Corp., Chicago, IL (US)

( * ) Notice: Subject to any disclaimer, the term of this patent is extended or adjusted under 35 U.S.C. 154(b) by 0 days.

(21) Appl. No.: 09/280,310

(22) Filed: Mar. 29, 1999

(51) Int. Cl.[7] .................................................. B60K 17/06
(52) U.S. Cl. ............................................. 180/337; 180/364
(58) Field of Search ................................. 180/337, 338, 180/364

(56) References Cited

U.S. PATENT DOCUMENTS 3,888,142 * 6/1975 Ziegele ................................ 477/109
4,403,178 * 9/1983 Kaminski ............................. 318/484

* cited by examiner

Primary Examiner—Paul N. Dickson
(74) Attorney, Agent, or Firm—Jeffrey P. Calfa; Dennis Kelly Sullivan; Gilberto Hernandez

(57) ABSTRACT

A circuit for the electrical system of an automotive vehicle, such as a truck, interfaces a two-speed axle selector switch (20) and a two-speed axle solenoid (18) with the vehicle ignition, or key, switch (12), the vehicle brake actuation switch (16), and the vehicle transmission neutral switch (14) to allow the axle to be shifted between its two speed ranges under certain conditions and to disallow such shifting under other conditions. The circuit includes a high range relay (22), a high range enable relay (24), a high range disable relay (26), and a low range relay (28).

16 Claims, 1 Drawing Sheet

CONTROLLED TWO-SPEED AXLE SHIFTING WITH AUTOMATIC TRANSMISSION

FIELD OF THE INVENTION

This invention relates generally to automotive vehicles and their electrical circuits. More particularly, it relates to vehicles that have automatic transmissions and two speed axles, and electric circuits associated with shifting of such axles between high and low speed ranges.

BACKGROUND AND SUMMARY OF THE INVENTION

A known truck powertrain comprises an internal combustion engine that drives road-engaging wheels through a drivetrain. A known drivetrain comprises an automatic transmission, a driveshaft, and an axle. The engine is coupled to the input of the transmission, and the driveshaft couples the output of the transmission to the axle at the ends of which the wheels are mounted.

A multi-speed axle, such as a two-speed axle, which can provide different drive ratios to the wheels, enables the driver of a vehicle to select a drive ratio that he or she deems appropriate to a particular driving situation. In the case of a vehicle having a two-speed axle, an electric selector switch for selecting a particular one of two different axle speeds (axle ratios) is accessible to the driver. That switch is part of an electric circuit that includes an actuator, such as a solenoid for example, that operates on the axle's mechanism to cause the axle to operate in either one speed range or the other.

For any of various different reasons, it may be appropriate for such an axle to be shifted from one speed range to another only under certain prevailing conditions. Hence, axle speed shifting may be allowed under some conditions and prohibited under others.

One aspect of the present invention relates to a new and unique circuit for interfacing a two-speed axle selector switch with a two-speed axle so as to allow axle speed shifting under certain conditions and to disallow axle speed shifting under others.

A presently preferred embodiment of the invention employs known circuit components connected in a new and unique cooperative association to achieve the desired objective.

The foregoing, along with further features and advantages of the invention, will be seen in the following disclosure of a presently preferred embodiment of the invention depicting the best mode contemplated at this time for carrying out the invention. The disclosure includes a drawing, briefly described as follows.

DESCRIPTION OF THE PREFERRED EMBODIMENT

Figure 1:
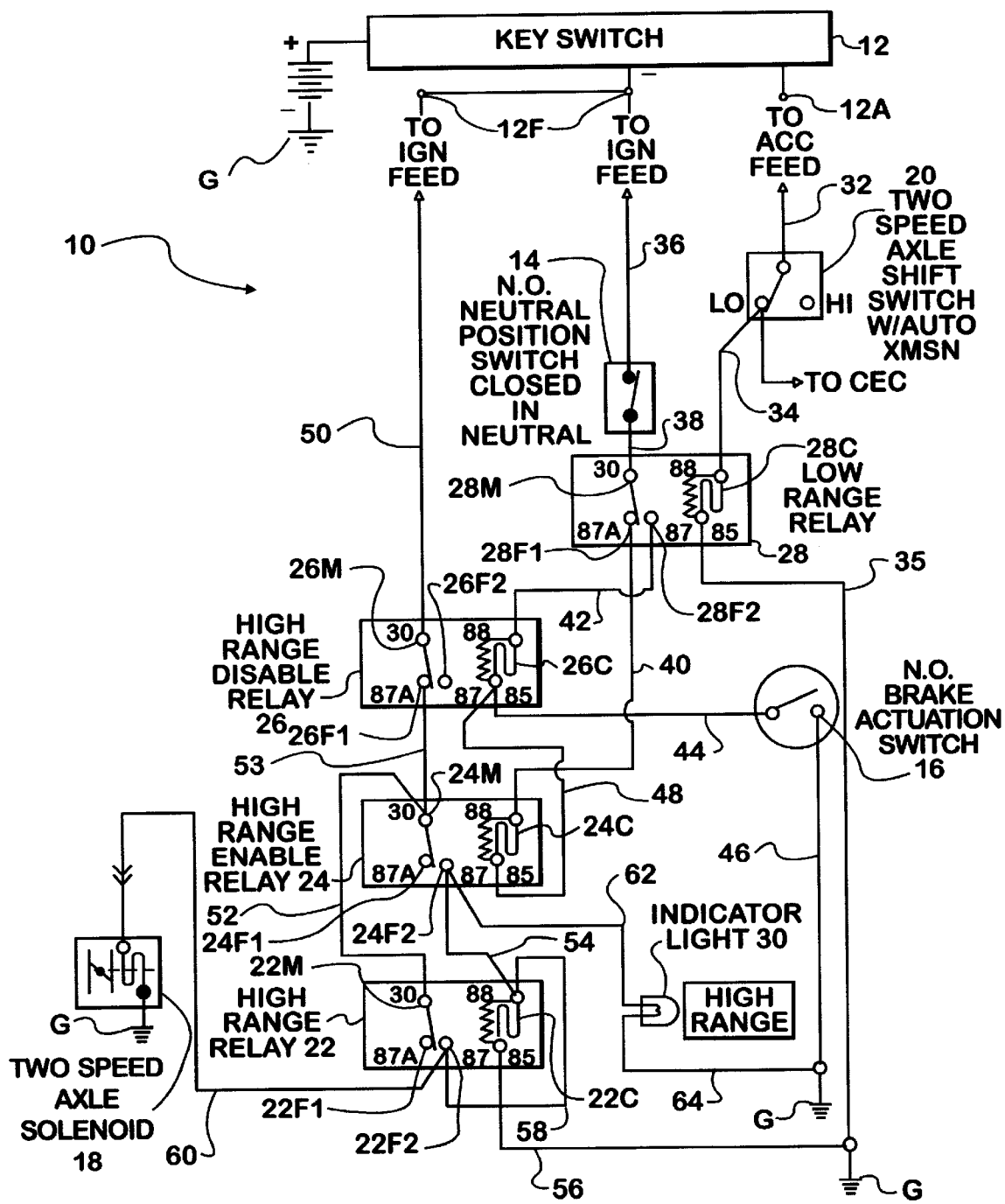
FIG. 1 is an electrical schematic diagram of an exemplary circuit for selecting the speed of a two-speed axle in accordance with principles of the present invention.

FIG. 1 shows an embodiment of the inventive circuit 10 for an automotive vehicle, such as a truck for example, that has an engine, automatic transmission, driveshaft, and two-speed axle as described earlier. Circuit 10 shares, with other circuits that are not shown, several existing circuit components of the vehicle, including a switch 12 for turning the engine on and off and a transmission neutral switch 14. Circuit 10 also comprises a brake actuation switch 16 which is not shared with other circuits in this particular embodiment.

Switch 12 is sometimes referred to as a key switch, or as an ignition switch. In any case, it is a known type of switch that is presently used in automotive vehicles like certain medium and heavy trucks. Switch 12 is operable to different positions to feed various circuits of the vehicle depending on switch condition. The drawing shows an ignition feed terminal 12F and an accessory feed terminal 12A. Transmission neutral switch 14 is associated with the automatic transmission to distinguish between a condition when the transmission is in a neutral gear incapable of turning the driveshaft and a condition when the transmission is in a drive gear capable of turning the driveshaft. Brake actuation switch 16 is associated with the service brake system of the vehicle to distinguish between a condition when the service brakes are being applied and one when they are not.

Circuit components that are specific to axle shifting are a solenoid 18 that controls the application of air to a two-speed axle shift motor, a selector switch 20 that is accessible for operation by the driver, a high range relay 22, a high range enable relay 24, a high range disable relay 26, a low range relay 28, and an indicator light 30 disposed for viewing by the driver.

When switch 12 is in OFF position, feed terminals 12A and 12F are not hot, but when it is in ON position, those terminals are hot, and the engine can run. When switch 12 is in ACCESSORY position, only accessory feed terminal 12A is hot, and because ignition feed terminal 12F is not, the engine cannot run.

When the transmission is in a drive gear, transmission neutral switch 14 is open, and when the transmission is not in a drive gear, the switch is closed.

When the driver is not operating the service brakes, switch 16 is open; when the service brakes are being actuated with over 30 p.s.i. application pressure, the switch is closed.

When solenoid 18 is not being energized, the axle operates in one of its two speed ranges, the low speed range and when the solenoid is being energized, the axle operates in its other speed range, the high speed range.

When selector switch 20 is in a position selecting low speed range, circuit 10, as will be explained in more detail later, causes the axle to operate in its low speed range, and when the switch is in a position selecting high speed range, circuit 10, as will also be explained later, causes the axle to operate in its high speed range.

Thus, each switch 14 and 16 is essentially a two-position, on-off type switch. Switch 20 is essentially a two-position, on-on type switch, but because only one of its two load terminals is utilized in this particular circuit embodiment, it appears like an on-off switch to the circuit.

Each of the four relays 22, 24, 26, and 28 appears schematically identical, comprising a respective operating coil 22C, 24C, 26C, and 28C, a respective first fixed contact 22F1, 24F1, 26F1, and 28F1, a respective second fixed contact 22F2, 24F2, 26F2, and 28F2, and a respective movable contact 22M, 24M, 26M, and 28M that is operated by the respective operating coil to selectively establish contact with the respective first and second fixed contacts. FIG. 1 shows each relay 22, 24, 26, 28 in a respective first condition where its respective operating coil 22C, 24C, 26C, and 28C is not being energized, causing its respective movable contact 22M, 24M, 26M, and 28M to make contact with its respective first fixed contact 22F1, 24F1, 26F1, and 28F1. When the respective operating coil is energized, the respective relay operates to a second condition where the respective movable contact has been moved out of contact with the respective first fixed contact and has contact with the respective second fixed contact 22F2, 24F2, 26F2, and 28F2. Thus, each relay provides two respective controlled conductivity paths through it, one of which is, at any given time, conductive and the other of which is not conductive (ignoring the short times when the movable contact is transitioning from one fixed contact to the other). In other words, each controlled conductivity path is operable to a first conductivity condition providing circuit continuity from the respective movable contact to the respective fixed contact, and to a second conductivity condition that interrupts that continuity.

The components of circuit 10 that have been described are connected in circuit in the following manner. In FIG. 1, the symbol G represents ground, and the electric D.C. power supply is also shown by a conventional schematic symbol. One terminal of coil 28C is fed through selector switch 20 from accessory feed terminal 12A via conductors 32, 34. The opposite terminal of coil 28C is grounded via a conductor 35. Movable contact 28M is fed through transmission neutral switch 14 from ignition feed terminal 12F via conductors 36, 38. A conductor 40 connects fixed contact 28F1 to one terminal of coil 24C. A conductor 42 connects fixed contact 28F2 to one terminal of coil 26C. The opposite terminal of coil 26C is connected to ground through brake actuation switch 16 via conductors 44, 46, and because the opposite terminals of both coils 24C, 26C are connected in common via a conductor 48, coil 24C is also connected through switch 16 to ground.

Movable contact 26M is connected to feed terminal 12F via a conductor 50. A conductor 52 connects movable contacts 24M, 22M in common, and a conductor 53 connects these commonly connected movable contacts with fixed contact 26F1. A conductor 54 connects fixed contact 24F2 to one terminal of coil 22C, and the opposite terminal of that coil is connected via a conductor 56 to ground. The terminal of coil 22C that is in common with fixed contact 24F2 via conductor 54 is also in common with fixed contact 22F2 via a conductor 58, and a conductor 60 connects the latter contact 22F2 with one terminal of solenoid 18. The other solenoid terminal is grounded. Indicator light 30 is connected between fixed contact 24F2 and ground via conductors 62, 64. Fixed contacts 22F1, 24F1, and 26F2 are not used in circuit 10.

In the condition shown by FIG. 1, no relay is energized, and neither is solenoid 18, provided that switch 12 is in OFF position. When switch 12 is operated to ON position, both feed terminals 12A, 12F are made hot, and with switch 20 in the low-speed position low range relay 28 becomes energized, breaking the feed to coil 24C of high range enable relay 24 and making a feed to coil 26C of high range disable relay 26. But both relays 24, 26 remain de-energized so long as the service brakes are not actuated. Because high-range relay 22 can be energized only if high range enable relay 24 is also energized, the continued de-energization of the latter relay 24 prevents the former relay 22 from energizing solenoid 18. Consequently, solenoid 18 remains de-energized, and the axle remains in the low speed operating range.

When switch 20 is operated to select the high speed axle range while switch 12 is on, energization of low range relay 28 ceases. With the transmission in neutral, system voltage is now fed through transmission neutral switch 14 and relay 28 to coil 24C of high range enable relay 24, but relay 24 will be energized only if the service brakes are applied to cause coil 24C to be grounded by the attendant closure of brake actuation switch 16. Therefore, even after switch 20 has been operated to select high speed axle range, relay 24 will be energized only if the service brakes are applied with the transmission in neutral.

Loss of its energization also causes relay 28 to discontinue the feed to coil 26C of high range disable relay 26, consequently enabling that latter relay 26 to feed both movable contacts 22M and 24M. As the result of switch 12 being on, switch 20 selecting high, the transmission being in neutral, and the service brakes being applied, relay coil 24C is energized to move contact 24M from fixed contact 24F1 to fixed contact 24F2, and solenoid 18 becomes energized through relays 26 and 22, causing the axle to shift into its high speed range of operation. Conductor 58 serves to transmit the voltage that has been fed through to fixed contact 22F2 of relay 22 back to the relay's own coil 22C, thereby sealing relay 22 energized. The vehicle can now be operated by shifting the transmission out of neutral and releasing the service brakes. It should be noticed that as soon as relay 24 becomes energized, relay 22 becomes energized and high range indicator light 30 illuminates. The light remains illuminated during continued energization of solenoid 18 as an indication to the driver that the axle is operating in its high-speed range.

If the transmission is shifted out of neutral into a drive gear, the opening of switch 14 removes the system voltage feed to coil 24C of high range enable relay 24. However, the sealed state of high range relay 22 seals solenoid 18 energized. Having been sealed in its energized state by relay 22, solenoid 18 will de-energize only if switch 12 is operated out of its ON position, or if high range disable relay 26 is energized. Thus, switch 12 and movable contact 26M provide circuit interrupters ahead of high range relay 22 for interrupting the current path to the relay so that the relay and solenoid 18 can be unsealed to return the axle to its low speed range.

Relay 26 can be energized while switch 12 is in ON position, but it requires the concurrence of switch 20 selecting low speed range, of application of the service brakes, and of the transmission being in neutral. The energizing of relay 26 breaks the system voltage feed to movable contact 22M, thereby unsealing relay 22 and de-energizing solenoid 18.

Hence, when switch 12 is in ON position, switch 20 is effective to change the axle from one speed range of operation to the other, but only at the same time that the transmission is out of a drive gear and the service brakes are being applied. Any time that switch 12 is turned to OFF position, power is removed from movable contact 22M, unsealing relay 22 and de-energizing solenoid 18, regardless of the conditions of other switches. Light 30 is extinguished whenever the axle is not in its high speed range of operation. After switch 12 has been turned to OFF position, and then operated to re-start the engine, the service brakes must continue to be applied until light 30 illuminates to confirm axle shifting into high speed range. However, if the vehicle has been running with the axle in high speed range, and the engine stops, the use of the ignition feed to contact 26M allows the engine to be restarted without the axle reverting to its low speed range, provided that switch 12 is not first turned to its OFF position before re-starting is attempted.

Because the transmission must be in neutral, and the service brakes applied, for the axle to be operated from one speed range to the other, the invention serves to thwart attempted shifting of the axle between speed ranges while the engine is delivering torque through the drivetrain at high speeds to the wheels. Such prevention may avoid damage that might otherwise occur in the absence of the invention. It can be seen that the disclosed embodiment utilizes known electric circuit components, thereby avoiding any need to design special components for accomplishing the desired result. The use of electromechanical relays for controlled conductivity devices is considered desirable for truck applications, but those skilled in the art will appreciate that the inventive principles may be practiced in circuits that utilize solid state components or devices. The sharing of existing components like switch 14 for example provides a certain degree of synergy, but it is to be recognized that circuits embodying the inventive principles may use either devoted or shared switches, or sensors, as electric circuit devices for determining brake actuation and/or transmission position.

While a presently preferred embodiment of the invention has been illustrated and described, it should be appreciated that principles of the invention are applicable to all embodiments that fall within the scope of the following claims.

What is claimed is:

1. An electric circuit for an automotive vehicle that comprises an engine for powering the vehicle, a drivetrain through which the engine can deliver torque to road-engaging wheels for propelling the vehicle, and brakes which can be selectively applied to brake the vehicle, the drivetrain comprising a multi-speed axle that contains the wheels, an axle-shifting mechanism, including an electric actuator, for shifting the axle between different speed ranges, and a transmission that operatively couples the engine to the axle and can be selectively shifted to a neutral gear incapable of transmitting engine torque to the axle and to a drive gear capable of transmitting engine torque to the axle, the electric circuit comprising:

an electric circuit device for distinguishing between actuation and non-actuation of the brakes;

an electric circuit device for distinguishing between the transmission being in neutral gear and the transmission being in drive gear; and electric circuitry operatively coupling the two electric circuit devices with the actuator for allowing the actuator to change the speed range of the axle upon concurrence of the brakes being actuated and the transmission being in neutral gear, and for disallowing the actuator to change the speed range of the axle if either the brakes are not being actuated or the transmission is in drive gear.

2. An electric circuit as set forth in claim 1 in which the electric circuit device for distinguishing between actuation and non-actuation of the brakes comprises a first electric switch, and the electric circuit device for distinguishing between the transmission being in neutral gear and the transmission being in drive gear comprises a second electric switch.

3. An electric circuit as set forth in claim 2 in which the first electric switch assumes an open circuit condition to indicate non-actuation of the brakes and a closed circuit condition to indicate actuation of the brakes, and the second electric switch assumes a closed circuit condition to indicate the transmission being in neutral gear and an open circuit condition to indicate the transmission being in drive gear.

4. An electric circuit as set forth in claim 1 including an electric selector device for selecting between multiple speed ranges of the axle, and in which the circuitry is enabled to shift the axle from a present speed range to a new speed range in response to operation of the electric selector device from selecting the present speed range to selecting a new speed range only if both the electric circuit device for distinguishing between actuation and non-actuation of the brakes is indicating brake actuation and the electric circuit device for distinguishing between the transmission being in neutral gear and the transmission being in drive gear is indicating the transmission being in neutral gear.

5. An electric circuit as set forth in claim 4 in which the electric selector device for selecting between multiple speed ranges of the axle comprises a switch that assumes a closed circuit condition to select one axle speed and an open circuit condition to select another axle speed.

6. An automotive vehicle comprising an engine for powering the vehicle, a drivetrain through which the engine can deliver torque to road-engaging wheels for propelling the vehicle, and brakes which can be selectively applied to brake the vehicle, the drivetrain comprising a multi-speed axle that contains the wheels, an axle-shifting mechanism, including an electric actuator, for shifting the axle between different speed ranges, and a transmission that operatively couples the engine to the axle and can be selectively shifted to a neutral gear incapable of transmitting engine torque to the axle and to a drive gear capable of transmitting engine torque to the axle, the vehicle further comprising an electric system that comprises an electric circuit for operating the electric actuator of the axle to place the axle in a selected one of the different speed ranges, the electric circuit comprising an electric circuit device for distinguishing between actuation and non-actuation of the brakes, an electric circuit device for distinguishing between the transmission being in neutral gear and the transmission being in drive gear, and circuitry operatively coupling the two electric circuit devices with the actuator for allowing the actuator to change the speed range of the axle upon concurrence of the brakes being actuated and the transmission being in neutral gear, and for disallowing the actuator to change the speed range of the axle if either the brakes are not being actuated or the transmission is in drive gear.

7. An automotive vehicle as set forth in claim 6 in which the circuitry includes an electric selector device for selecting between multiple speed ranges of the axle, and in which the circuit is enabled to shift the axle from a present speed range to a new speed range in response to operation of the electric selector device from a present position selecting the present speed range to a new position selecting a new speed range only if both the electric circuit device for distinguishing between actuation and non-actuation of the brakes is indicating brake actuation and the electric circuit device for distinguishing between the transmission being in neutral gear and the transmission being in drive gear is indicating the transmission being in neutral gear.

8. An automotive vehicle as set forth in claim 7 in which the actuator for the axle comprises an electric device that when energized places the axle in a first speed range of operation, and when not energized, places the axle in a second speed range of operation, and the circuitry comprises a first controlled conductivity device having a controlled conductivity path that is selectively operable to relatively more conductive and relatively less conductive conditions, a second controlled conductivity device having a controlled conductivity path that is selectively operable to relatively more conductive and relatively less conductive conditions, a third controlled conductivity device having a controlled conductivity path that is selectively operable to relatively more conductive and relatively less conductive conditions, conductors connecting the first and second controlled conductivity devices under control of the electric circuit device for distinguishing between actuation and non-actuation of the brakes and the electric circuit device for distinguishing between the transmission being in neutral gear and the transmission being in drive gear and conductors connecting the controlled conductivity paths of the first and third controlled conductivity devices in series circuit to the electric device of the axle and the controlled conductivity paths of the first and second controlled conductivity devices in series circuit to the third controlled conductivity device such that the controlled conductivity paths of the first and second controlled conductivity devices are rendered relatively more conductive only when both the electric circuit device for distinguishing between actuation and non-actuation of the brakes is indicating brake actuation and the electric circuit device for distinguishing between the transmission being in neutral gear is indicating the transmission in neutral gear, and the controlled conductivity path of the third controlled conductivity device is rendered relatively more conductive only when the controlled conductivity paths of the first and second controlled conductivity devices are both relatively more conductive, and a further conductor that is associated with the third controlled conductivity device to seal the controlled conductivity path of the third controlled conductivity device relatively more conductive upon the controlled conductivity paths of the first and third conductivity devices being rendered relatively more conductive.

9. An automotive vehicle as set forth in claim 8 in which the circuitry further comprises a fourth controlled conductivity device having a controlled conductivity path that is selectively operable to relatively more conductive and relatively less conductive conditions corresponding to the positions of the electric selector device.

10. An automotive vehicle as set forth in claim 9 in each of the first, second, third, and fourth controlled conductivity devices comprises a respective first, second, third, and fourth relay having a respective coil that is selectively energized and de-energized to control the conductivity of the respective controlled conductivity path, and the coil of the fourth relay is energized when the electric selector device is in one position and de-energized when the electric selector device is in another position.

11. An automotive vehicle as set forth in claim 10 in which the fourth relay comprises two such controlled conductivity paths, a first of which is relatively more conductive when the coil of the fourth relay is de-energized and relatively less conductive when the coil of the fourth relay is energized, and a second of which is relatively less conductive when the coil of the fourth relay is de-energized and relatively more conductive when the coil of the fourth relay is energized, and in which one of the two controlled conductivity paths of the fourth relay is connected in series with the coil of the first relay, and the other of the two controlled conductivity paths of the fourth relay is connected in series with the coil of the second relay.

12. An automotive vehicle as set forth in claim 11 in which the first controlled conductivity path of the fourth relay is connected in series with the coil of the second relay, and the second controlled conductivity path of the fourth relay is connected in series with the coil of the first relay.

13. An automotive vehicle as set forth in claim 12 in which one of the two electric circuit devices comprises a switch that is connected in series relation to each coil of the first and second relays.

14. An automotive vehicle as set forth in claim 13 in which the switch is associated with the brakes to be closed when the brakes are being actuated and to be open when the brakes are not being actuated, the other of the two electric circuit devices comprises a switch that is associated with the transmission to be closed when the transmission is in neutral gear and to be open when the transmission is in drive gear, and the latter switch is in series with the first controlled conductivity path of the fourth relay.

15. An automotive vehicle as set forth in claim 7 in which the electric selector device comprises a two position selector switch for selecting a low speed range for the axle when in one position and a high speed range for the axle when in the other position, and the actuator comprises a solenoid that, when de-energized, places the axle in low speed range, and when energized, places the axle in high speed range.

16. An automotive vehicle as set forth in claim 15 in which the circuitry comprises a relay having a coil that when energized closes contacts of the relay to complete a current path to the actuator, and the contacts, when closed by energization of the coil, are connected to seal the coil energized, and an interrupter is disposed in the current ahead of the relay contacts for unsealing the coil.

* * * * *